July 11, 1967 J. P. LANDIS 3,331,011
INVERTER CONTROL MEANS
Filed Feb. 3, 1964 3 Sheets-Sheet 1

INVENTOR
JAMES P. LANDIS
BY Daniel O. Fetterley
ATTORNEY

INVENTOR
JAMES P. LANDIS
BY Daniel O. Fetterley
ATTORNEY

July 11, 1967   J. P. LANDIS   3,331,011
INVERTER CONTROL MEANS

Filed Feb. 3, 1964   3 Sheets-Sheet 3

INVENTOR
JAMES P. LANDIS
BY Daniel D. Fetterley
ATTORNEY

United States Patent Office 3,331,011
Patented July 11, 1967

3,331,011
INVERTER CONTROL MEANS
James P. Landis, Wauwatosa, Wis., assignor to The Louis Allis Company, Milwaukee, Wis., a corporation of Wisconsin
Filed Feb. 3, 1964, Ser. No. 342,023
3 Claims. (Cl. 321—44)

This invention relates to a means for turning off controlled rectifiers in inverters.

Inverters are utilized for changing direct current to alternating current and are of two general types. A rotary inverter employs the direct current input to operate a D.C. motor and, by means of slip rings and winding taps, produces the alternating current output. Static inverters employ electronic components to control the direction and magnitude of the output voltage and current. Rectifying elements, because of their unidirectional current flow characteristics, lend themselves to application in static inverter circuitry.

To provide a satisfactory alternating current output, the unidirectional current conducting state of the rectifying elements in the inverter must be closely controlled. Such control is generally accomplished through the use of three element rectifiers. These rectifiers may be gas filled tubes, such as thyratrons, or semi-conductor controlled rectifiers. In either case, the controlled rectifier has a positive element or anode and a negative element or cathode. In the former, a third element is termed the grid and is used to initiate conduction; in the latter, it is termed the gate and is similarly utilized. Controlled rectifiers generally exhibit the characteristic that, once conduction is started by the grid or gate circuit, such circuit loses all influence over conditions existing in the rectifier. Conduction may be stopped only by adjusting the voltage on the anode and cathode elements of the rectifier.

Turning on the rectifier elements or switching them into the conducting state generally presents few problems. The anode and cathode terminals are biased in a manner conducive to conduction and a small signal, both in magnitude and duration, applied to the gate or grid, is sufficient to initiate conduction. Turning off the rectifier elements or switching them into the non-conducting state presents a greater problem. Generally, a much larger signal is required for turn-off as it is applied to the anode and cathode of the rectifier, and the signal must be greater in time duration to insure that the element attains the non-conducting state and remains in that state. The turn-off of the rectifier elements must be positive and reliable, as there is danger of damaging short circuits occurring in the inverter circuitry if the elements are not properly turned off. Turn-off may also be hampered by conditions in the output circuit, as where the rectifier elements are being commutated at short intervals, or where the voltages available in the inverter for rectifier turn-off are low. The direct current input required by inverter circuitry makes unavailable the natural turn-off or commutation properties of alternating current.

It is, therefore, an object of the present invention to provide a positive, reliable means for switching controlled rectifier elements of an inverter into the non-conducting state.

An additional object of this invention is to provide such positive switching-off of the controlled rectifier elements by a means which is independent of the inverter circuitry and unaffected by conditions existing therein.

It is a specific object of this invention to provide such switching-off by means of an auxiliary inverter, which operates independently of the inverter connected to the load, to turn off the controlled rectifiers in the latter.

The invention, both as to its organization and method of operation, taken with further objects and advantages thereof will be best understood by reference to the following description taken in conjunction with the accompanying drawings, in which.

Figure 1:
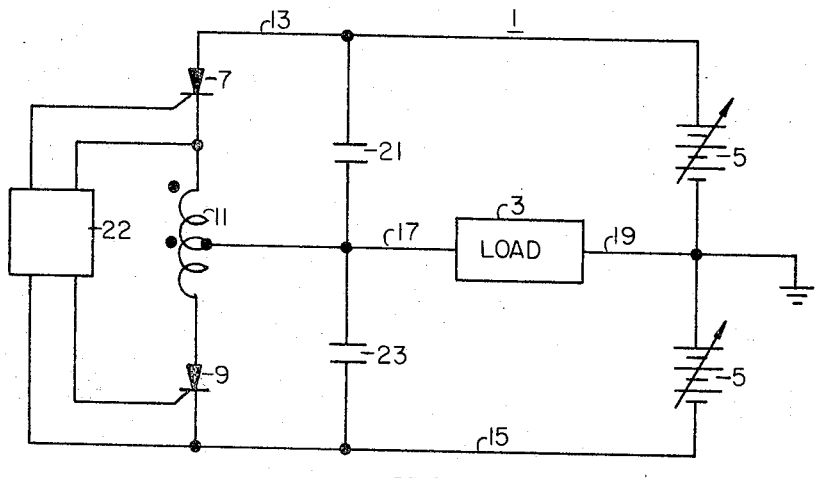
FIGURE 1 represents a prior art circuit for turning off inverter rectifier elements.

Referring now to the drawings, and more particularly to FIGURE 1, a commonly used prior art inverter circuit including means for turning off the rectifier elements is shown therein. The numeral 1 represents a single phase inverter for supplying alternating current to load 3 from a direct current source, shown illustratively as adjustable batteries 5. Controlled rectifiers 7 and 9, and center tapped inductor 11, are connected in series across the positive D.C. conductor 13 and the negative D.C. conductor 15. Rectifiers 7 and 9 may be of any controlled type and are shown as silicon controlled rectifiers for purposes of illustration. The center tap of inductor 11 is connected to load 3 via conductor 17. The load circuit is completed by conductor 19. Capacitor 21 is connected between positive D.C. conductor 13 and conductor 17, while capacitor 23 is connected between conductor 17 and negative D.C. conductor 15. Capacitors 21 and 23 are utilized to switch controlled rectifiers 7 and 9 to the non-conducting state in a manner hereinafter shown.

To provide an alternating current through load 3 from D.C. supply 5, rectifiers 7 and 9 are alternately rendered conductive by a firing signal supplied between the gate and the cathode of the controlled rectifier by firing circuit 22. Thus, current flows alternately in a counterclockwise direction through the upper loop of inverter circuitry 1 when rectifier 7 is in the conductive state, and counterclockwise in the lower loop of inverter circuitry when rectifier 9 is in the conductive state, providing a reversing or alternating current through load 3.

To turn off controlled rectifiers 7 and 9 during intervals when conduction is not desired, capacitors 21 and 23 are utilized. In the instance where controlled rectifier 7 is conducting, capacitor 23 will be charged in the same polarity as batteries 5 and to a voltage equal to a combined voltage of both batteries 5, as capacitor 23 is, in effect, connected between positive conductors 13 and negative conductor 15 due to the negligible voltage drop across conducting controlled rectifier 7 and the upper half of center tapped inductor 11.

When controlled rectifier 9 is fired to reverse current flow through load 3 and it is desired to turn off rectifier 7, a discharge path for capacitor 23 is provided through the lower half of center tapped inductor 11 and controlled rectifier 9. The current produced by the discharge of capacitor 23 through the lower half of center tapped inductor 11 produces a positive voltage at the center tap of inductor 11 in relation to the lower end of inductor 11 equal to the combined voltage of batteries 5. There is likewise produced a voltage of the same potential between the center tap of inductor 11 and its upper end. This latter voltage, generated in the upper half of inductor 11, is of a polarity to oppose current flow through controlled rectifier 7 and is sufficient to back-bias that rectifier and render it non-conductive. Capacitor 21 begins to charge during this interval and operates in a similar manner to render controlled rectifier 9 non-conductive upon the firing of controlled rectifier 7.

Figure 2A:
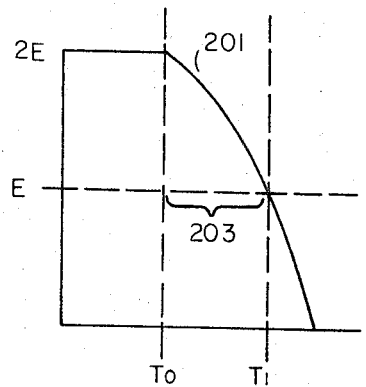
FIGURE 2 shows conditions existing in the prior art circuit of FIGURE 1.

While the above described circuit for switching off controlled rectifiers in inverter circuitry is a simple one, it is defective in several instances. When the inverter is operated at low voltage, the charge stored in the capacitors may be so small as to discharge too rapidly to insure turn-off of the controlled rectifiers. For example, in FIGURE 2A which shows discharge conditions for capacitors 21 and 23 in inverter circuitry 1, the voltage between conductor 13 and conductor 15 is the combined voltage of batteries 5 and is shown in FIGURE 2A as voltage 2E. As stated above, capacitors 21 and 23 will charge to the combined voltage of batteries 5 or voltage 2E. When a discharge path is opened to the capacitors by the firing of controlled rectifier 7 or 9, as for example at time $T_0$ in FIGURE 2A, capacitor 21 or 23 will discharge at a rate dependent upon its capacitance and the impedance existing in the discharge path. Graph 201 shows capacitor discharge under conditions of full voltage from batteries 5. A turn-off signal will be applied to the rectifier, to be switched off for as long as the capacitor discharge voltage 201 remains above the voltage impressed across the rectifier in the forward direction by the single battery 5 across which it is connected. This is the time interval between $T_0$ and $T_1$ and is indicated in FIGURE 2A by the numeral 203. Time interval 203 must be of the order of 12 to 50 microseconds long to insure turn-off of controlled rectifiers of the type commonly used in industrial equipment.

Figure 2B:
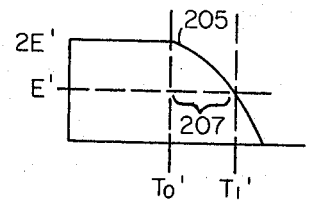

FIGURE 2B shows discharge conditions in the instance where the voltage to the load is reduced by reducing the potential of batteries 5. Capacitors 21 and 23 are then charged to the reduced level of combined batteries 5, shown as 2E′ in FIGURE 2B, and provide a controlled rectifier turn-off signal as long as capacitor voltage exceeds the voltage of a single battery 5, that is, voltage E′. The graph of discharge voltage under conditions of reduced voltage to the load is indicated by 205. The time interval during which a turn-off signal is available is $T_0'$ to $T_1'$ and is shown by 207. It will be noted that the time interval has decreased considerably in duration, and may be so short as to fail to turn off the rectifiers. Should a controlled rectifier fail to turn off, a short circuit would occur in the inverter, as both rectifiers would then be conducting, blowing protective fuses and interrupting the service of the inverter. The above described problem has heretofore severely limited the use of static inverter circuitry by preventing their use over wide voltage ranges. Prior art static inverters have been designed for operation at specific voltage levels, with a resulting inflexibility in their application and use.

The inverter circuitry described and claimed in this patent avoids the problems of the prior art by providing an auxiliary inverter to turn off the controlled rectifier elements in the inverter connected to the load. The separate auxiliary inverter operates from a constant potential direct current source, and hence insures reliable turn-off, even with the voltage in the main or load connected inverter is reduced.

Figure 3:
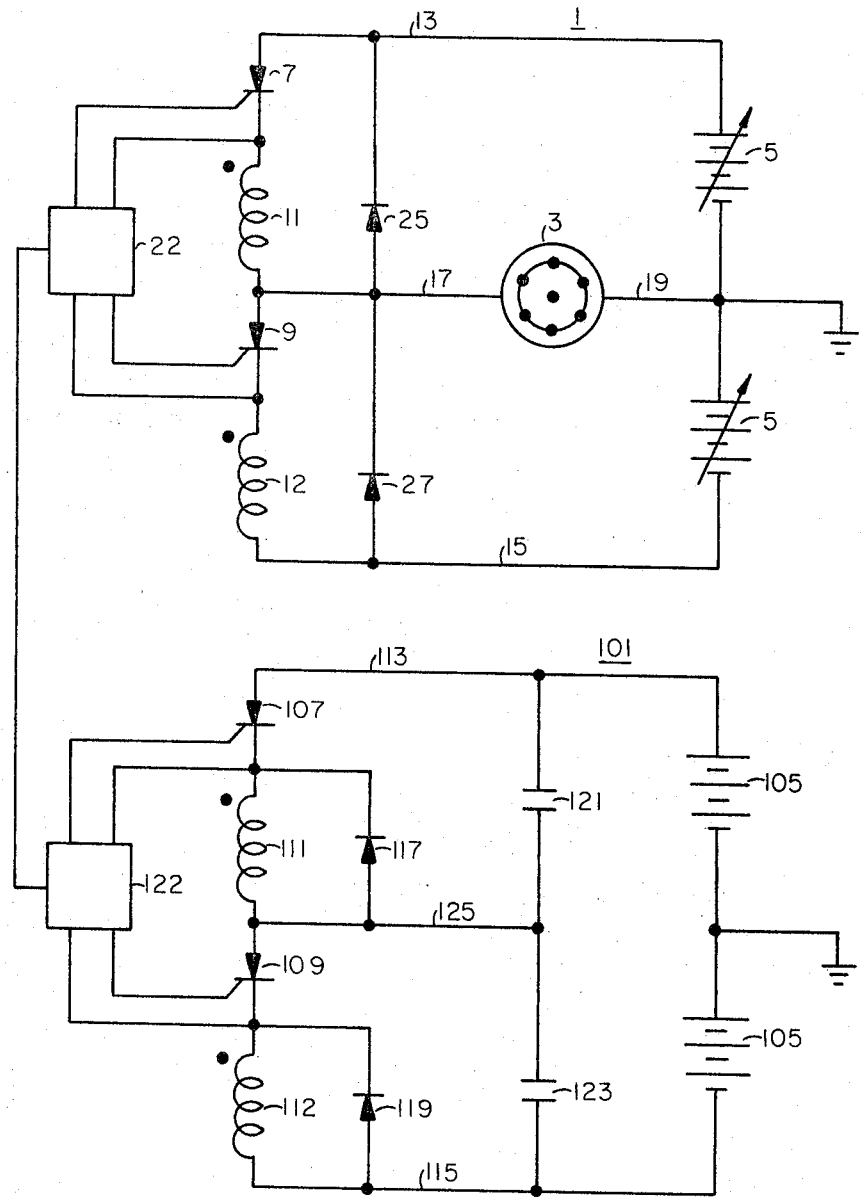
FIGURE 3 illustrates single phase inverter circuitry utilizing the principles of the present invention to provide turn-off of the rectifier elements.

Referring now to FIGURE 3, there is shown therein inverter circuitry employing an auxiliary inverter to switch off the controlled rectifiers of the main inverter connected to the load, in accordance with the teachings of the invention contained in this patent. The numeral 1 describes the main inverter, and insofar as it resembles the inverter of FIGURE 1, like elements are similarly identified. Thus, inverter 1 supplies alternating current to a load, shown for illustrative purposes as single phase induction motor 3, from an adjustable direct current supply source shown, also illustratively, as adjustable batteries 5. Controlled rectifiers 7 and 9 are connected across the adjustable D.C. source 5 by positive D.C. conductor 13 and negative D.C. conductor 15. Inductor secondary windings 11 and 12 are connected in series with controlled rectifiers 7 and 9, and the above described series connected elements are connected to the load 3 by conductor 17. The load circuit is completed by conductor 19. A diode 25 is connected between positive D.C. conductor 13 and common conductor 17, while diode 27 is connected between common conductor 17 and negative D.C. conductor 15. These diodes form a discharge path for any inductive energy in load 3. The gate circuits of controlled rectifiers 7 and 9 are controlled by firing circuit 22.

The operation of main inverter 1 is similar to that of the inverter circuitry shown in FIGURE 1 in that power to the load alternately circulates in one direction through load 3 when controlled rectifier 7 is conductive, and in the opposite direction through load 3 when rectifier 9 is conductive.

An auxiliary inverter, which has as its purpose the turning off of the controlled rectifiers 7 and 9 of inverter 1, is indicated by the numeral 101. Auxiliary inverter 101 comprises a constant potential D.C. source indicated by batteries 105, rectifiers 107 and 109 connected in series across constant potential D.C. source 105 by conductors 113 and 115, similarly wound inductor primary windings 111 and 112 connected in series with rectifiers 107 and 109 and shunted by diodes 117 and 119, and capacitors 121 and 123 connected in parallel with the above mentioned elements via conductor 125 and across constant D.C. source 105. Inductor primary windings 111 and 112 are inductively coupled to inductor secondary windings 11 and 12, respectively.

Firing circuit 122 is connected to the gates of controlled rectifiers 107 and 109. Firing circuits 22 and 122 are interlocked so as to provide for the maintenance of control between the turning-on of the controlled rectifiers 7 and 9 in the main inverter by firing circuit 22 and the turning-off of the rectifiers 7 and 9 by auxiliary inverter 101. In the instance where firing circuit 22 has switched controlled rectifier 7 on, a reverse biasing voltage in inductor secondary winding 11 will be required to turn this rectifier off. This, in turn, requires a voltage in inductor primary winding 111. This voltage is obtained by interlocking firing circuits 22 and 122 so that, when controlled rectifier 7 is fired on in the main inverter 1 by firing circuit 22, controlled rectifier 109 is turned on in the auxiliary inverter by firing circiut 122, allowing capacitor 121 to charge. When it is desired to turn off rectifier 7, controlled rectifier 107 in auxiliary inverter 101 is turned on, allowing capacitor 121 to discharge through it and through inductor primary 111, inducing a voltage therein. This induces a back-biasing voltage in inductor secondary winding 11, which turns off controlled rectifier 7.

Controlled rectifier 9 in main inverter 1 is turned off in a similar manner. Controlled rectifier 109 in the auxiliary inverter 101 is turned on, allowing charged capacitor 123 to produce a voltage in inductor primary winding 112, and hence in inductor secondary winding 12. This voltage back biases controlled rectifier 9 and turns it off.

Diodes 117 and 119 provide a discharge path for the inductive energy in inductor primary windings 111 and 112, resetting the windings. It is not necessary to provide a means for turning off controlled rectifiers 107 and 109 in auxiliary inverter 101. As there is no load in the auxiliary inverter 101, there is no conduction path available to the rectifiers, and the current flow ceases once the capacitors become charged.

It is to be noted that the above circuit provides for complete independence between the turning-off of one controlled rectifier in the main inverter and the turning-on of the succeeding one. The time interval between the turning-off of one controlled rectifier and the turning-on of the subsequent rectifier may be varied by controlling the relationship of the firing pulses of firing circuits 22 and 122. In actual practice, a delay is often permitted between turn-off of one rectifier and turn-on of the succeeding one, to permit any inductive currents in the inverter load to subside. The utilization of an auxiliary inverter to switch off the controlled rectifier elements of the inverter connected to the load also provides for turn-off of these controlled rectifier elements, independent of the voltages available in the main inverter circuit. This insures reliable turn-off regardless of the level of the main inverter input voltage, and permits the main inverter to operate over a wide voltage range, with a resulting flexibility in the application and use of the inverter.

Figure 4:
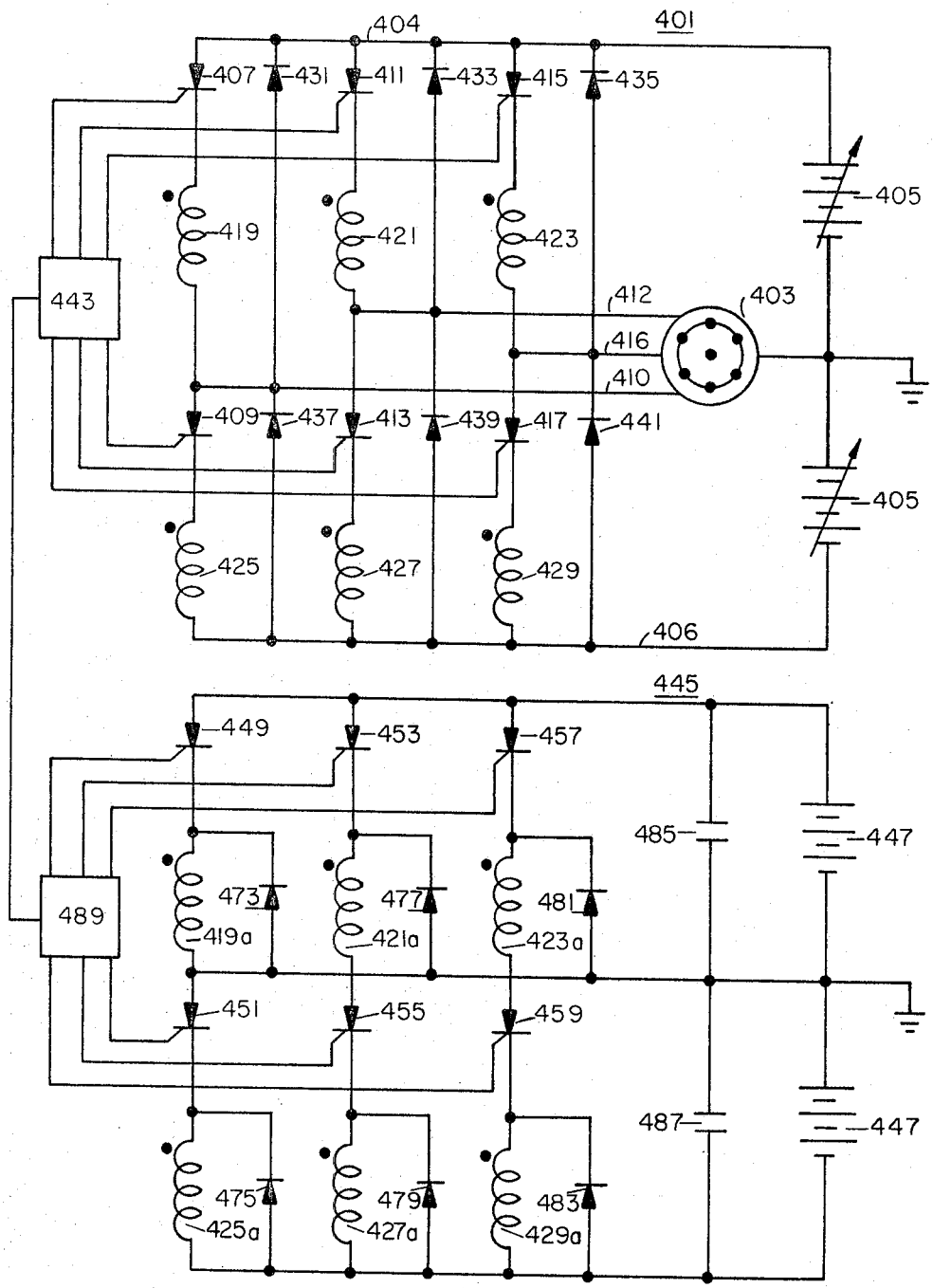
FIGURE 4 illustrates multiple phase inverter circuitry utilizing the principles of the present invention to provide turn-off of the rectifier elements.

While a single phase inverter has been shown for simplicity, the teachings of this invention are equally applicable to multiple phase inverters. For example, a three phase unit is shown in FIGURE 4, wherein the numeral 401 indicates a three phase main inverter employing auxiliary inverter 445 for controlled rectifier turn-off. Inverter 401 provides three phase alternating current to load 403, shown illustratively as a three phase induction motor. Adjustable batteries 405 supply inverter 401 with a D.C. input via conductors 404 and 406. A pair of controlled rectifiers for each output phase is connected across conductors 404 and 406. For example, in a three phase inverter shown in FIGURE 4, controlled rectifiers 407 and 409 are connected in series across conductors 404 and 406 and supply one phase of power to the load via conductor 410. Controlled rectifiers 411 and 413 are likewise connected in series and supply load 403 with a second phase of A.C. power through conductor 112. In a like manner, series-connected controlled rectifiers 415 and 417 supply the third phase of A.C. power to the load via conductor 416. Each of the controlled rectifiers 407 through 417 has a series-connected inductor secondary winding 419 through 429, and a parallel-connected diode 431 through 441, associated therewith. Firing circuit 443, connected to the gates of controlled rectifiers 407 through 417, provides firing pulses to the controlled rectifiers.

The auxiliary inverter 445 provides back-biasing voltage signals to turn off rectifiers 407 through 417 of main inverter 401. The auxiliary inverter is powered by a constant D.C. source, batteries 447. A pair of controlled rectifiers 449 through 459, for each output phase of the main inverter, is connected in series across batteries 447. Each of the controlled rectifiers 449 through 459 has associated therewith an inductor primary winding 419A through 429A, shunted by diodes 473 through 483. Inductor primary windings 419A through 429A are coupled to inductor secondary windings 419 through 429. Capacitors 483 and 487 are connected across each of the batteries 447. Firing circuit 489, synchronized with firing circuit 443 and connected to the gates of controlled rectifiers 449 through 459, provides firing pulses to these rectifiers.

The operation of main inverter 401 and auxiliary inverter 445 is similar to that of main inverter 1 and auxiliary inverter 101 of FIGURE 3. Firing circuit 443 switches on rectifiers 407 through 417 in a sequence to provide a three phase output to load 403. Auxiliary inverter 445 turns off these rectifiers in the appropriate sequence by means of back-biasing voltage signals to the controlled rectifiers in main inverter 401, stored in capacitors 485 and 487, and transmitted to the main inverter through inductor windings 419 through 429 and 419A through 429A.

Other modifications and alterations besides the addition of output phases may, of course, be made in the above described embodiment of the invention without departing from the true inventive spirit disclosed therein. It is intended that the appended claims cover all such modifications and alterations which fall within the true spirit and scope of this invention.

What is desired to be claimed and secured by Letters Patent of the United States is:

1. In inverter circuitry for changing direct current to alternating current by sequentially turning on and off at least one pair of controlled rectifiers, said controlled rectifiers having associated therewith a firing circuit for turning on said rectifiers, back-biasing inductor secondary windings to aid in turning off said rectifiers, and means for turning off said rectifiers, said means comprising:
auxiliary inverter circuitry comprising;
a constant potential direct current source, at least one pair of controllable unidirectional current-conducting devices connected in series across said constant potential direct current source,
inductor primary windings connected in series with said controllable unidirectional current-conducting devices and coupled to said inductor secondary windings to transmit a back-biasing signal thereto,
diodes connected across said inductor primary windings to reset said windings,
capacitive means connected to said inductor primary windings to provide back-biasing turn-off signals,
means to sequentially turn on said controllable unidirectional current-conducting devices,
said means synchronized with said firing circuit,
whereby direct current is changed to alternating current by controlling current flow through said controlled rectifiers by sequentially turning said controlled rectifiers on by said firing circuit and off by back-biasing signals in said secondary windings.

2. In inverter circuitry for changing direct current to alternating current by sequentially turning on and off at least one pair of controlled rectifiers, each of said rectifiers having back-biasing inductor secondary windings associated therewith, means to sequentially turn off each of said rectifiers comprising:
auxiliary inverter circuitry comprising a constant potential direct current source, inductor primary windings connected in series with said constant potential direct current source and coupled to said secondary windings to transmit back-biasing signals thereto and means connected to said power source and to each of said inductor primary windings and synchronized with the sequential turning on of said rectifiers for sequentially providing back-biasing signals to each of said primary windings to sequentially turn off each said rectifiers.

3. In inverter circuitry for changing direct current to alternating current by sequentially turning on and off at least one pair of controlled rectifiers, said controlled rectifiers having associated therewith a firing circuit for turning on said rectifiers, each of said rectifiers having associated therewith back-biasing inductor secondary windings to aid in turning off said rectifiers, means for turning off said rectifiers comprising:
auxiliary inverter circuitry comprising; a constant potential direct current source, at least one pair of controllable unidirectional current-conducting devices connected in series across said constant potential direct current source, inductor primary windings connected in series with each of said controllable unidirectional current-conducting devices and coupled to said inductor secondary windings to transmit a back-biasing signal sequentially generated in said inductor primary windings by said unidirectional current-conducting devices thereto, means to sequentially turn on said controllable unidirectional current-conducting devices, said means synchronized with said firing circuit,
whereby direct current is changed to alternating current by controlling current flow through said controlled rectifiers by sequentially turning said controlled rectifiers on by said firing circuit and off by back-biasing signals in said inductor secondary windings.

(References on following page)

References Cited

UNITED STATES PATENTS

| | | | |
|---|---|---|---|
| 2,821,639 | 1/1958 | Bright et al. | 307—88.5 |
| 3,097,335 | 7/1963 | Schmidt | 321—45 |
| 3,131,343 | 4/1964 | Reinert | 321—16 |
| 3,213,287 | 10/1965 | King | 307—71 |
| 3,263,152 | 7/1966 | Walker | 321—45 |
| 3,264,548 | 8/1966 | King | 321—45 |
| 3,286,155 | 11/1966 | Corey | 321—45 |

JOHN F. COUCH, *Primary Examiner.*

W. M. SHOOP, *Assistant Examiner.*